United States Patent
Choi et al.

(10) Patent No.: US 12,046,743 B2
(45) Date of Patent: Jul. 23, 2024

(54) CATHODE ACTIVE MATERIAL, METHOD FOR PREPARING SAME, AND LITHIUM SECONDARY BATTERY COMPRISING SAME

(71) Applicants: POSCO, Pohang-si (KR); RESEARCH INSTITUTE OF INDUSTRIAL SCIENCE & TECHNOLOGY, Pohang-si (KR); POSCO CHEMICAL CO., LTD., Pohang-si (KR)

(72) Inventors: Kwon Young Choi, Seoul (KR); Sang Hyuk Lee, Incheon (KR); Jong Il Park, Pohang-si (KR); Jung Hoon Song, Seoul (KR); Sang Cheol Nam, Seoul (KR)

(73) Assignees: POSCO HOLDINGS INC., Seoul (KR); RESEARCH INSTITUTE OF INDUSTRIAL SCIENCE & TECHNOLOGY, Pohang-si (KR); POSCOC CHEMICAL CO., LTD, Pohang-si (KR)

( * ) Notice: Subject to any disclaimer, the term of this patent is extended or adjusted under 35 U.S.C. 154(b) by 715 days.

(21) Appl. No.: 17/275,883

(22) PCT Filed: Sep. 16, 2019

(86) PCT No.: PCT/KR2019/011929
§ 371 (c)(1),
(2) Date: Apr. 19, 2021

(87) PCT Pub. No.: WO2020/055210
PCT Pub. Date: Mar. 19, 2020

(65) Prior Publication Data
US 2022/0045317 A1   Feb. 10, 2022

(30) Foreign Application Priority Data
Sep. 12, 2018 (KR) .................. 10-2018-0108883

(51) Int. Cl.
*H01M 4/00* (2006.01)
*C01G 53/00* (2006.01)
(Continued)

(52) U.S. Cl.
CPC ............ *H01M 4/366* (2013.01); *C01G 53/50* (2013.01); *H01M 4/505* (2013.01); *H01M 4/525* (2013.01);
(Continued)

(58) Field of Classification Search
CPC ............ H01M 4/525; H01M 10/0525; H01M 4/483; H01M 4/505; H01M 4/366;
(Continued)

(56) References Cited

U.S. PATENT DOCUMENTS 8,728,666 B2   5/2014   Itou et al.
11,387,453 B2   7/2022   Kaneda et al.
(Continued)

FOREIGN PATENT DOCUMENTS

CN   107069091 A   8/2017
JP   2002-279985 A   9/2002
(Continued)

OTHER PUBLICATIONS

Saitou et al., Positive Electrode Active Substance for Non-Aqueous Electrolyte Secondary Cell and Non-Aqueous Electrolyte Secondary Cell, Oct. 2017, See the Abstract. (Year: 2017).*
(Continued)

*Primary Examiner* — Cynthia H Kelly
*Assistant Examiner* — Monique M Wills
(74) *Attorney, Agent, or Firm* — Morgan, Lewis & Bockius LLP

(57) ABSTRACT

A positive active material, a manufacturing method thereof, and a lithium secondary battery including the same are disclosed, and a positive active material including lithium
(Continued)

metal oxide particles in a secondary particle form including primary particles, wherein the secondary particle surface includes planar primary particles with a narrow angle of 70 to 90° from among angles between a c axis of the primary particles and a straight line connecting a virtual point of a center of the primary particle and a center point of the secondary particle may be provided.

8 Claims, 7 Drawing Sheets

(51) Int. Cl.
- *H01M 4/36* (2006.01)
- *H01M 4/505* (2010.01)
- *H01M 4/525* (2010.01)
- *H01M 10/0525* (2010.01)
- *H01M 4/02* (2006.01)

(52) U.S. Cl.
CPC ..... *H01M 10/0525* (2013.01); *C01P 2004/84* (2013.01); *C01P 2006/40* (2013.01); *H01M 2004/028* (2013.01)

(58) Field of Classification Search
CPC .............. H01M 2004/028; C01G 53/42; C01G 53/00; C01G 53/50; C01P 202/52; C01P 2004/04; C01P 2006/40; C01P 2004/84
See application file for complete search history.

(56) References Cited

U.S. PATENT DOCUMENTS

| | | |
|---|---|---|
| 2012/0258365 A1 | 10/2012 | Yokoyama et al. |
| 2017/0092949 A1 | 3/2017 | Dai et al. |
| 2018/0190978 A1 | 7/2018 | Toma et al. |
| 2018/0254511 A1 | 9/2018 | Park et al. |

FOREIGN PATENT DOCUMENTS

| | | | | |
|---|---|---|---|---|
| JP | 2012-238495 A | 12/2012 | | |
| JP | 2017-016753 A | 1/2017 | | |
| KR | 10-0822012 B1 | 4/2008 | | |
| KR | 10-2010-0099337 A | 9/2010 | | |
| KR | 10-2012-0009779 A | 2/2012 | | |
| KR | 10-2013-0058342 A | 6/2013 | | |
| KR | 10-2014-0130067 A | 11/2014 | | |
| KR | 10-1577179 B1 | 12/2015 | | |
| KR | 10-1593401 B1 | 2/2016 | | |
| KR | 10-1611784 B1 | 4/2016 | | |
| KR | 10-2016-0129764 A | 11/2016 | | |
| KR | 10-1815779 B1 | 1/2018 | | |
| KR | 10-2018-0063862 A | 6/2018 | | |
| KR | 10-2018-0064295 A | 6/2018 | | |
| KR | 10-2018-0091754 A | 8/2018 | | |
| WO | 2006/118279 A1 | 11/2006 | | |
| WO | 2012/137535 A1 | 10/2012 | | |
| WO | WO-2013048071 A2 * | 4/2013 | ............. | C01D 15/02 |
| WO | WO-2017169184 A1 * | 10/2017 | ............ | H01M 10/05 |
| WO | 2018/020845 A1 | 2/2018 | | |
| WO | 2018/021557 A1 | 2/2018 | | |

OTHER PUBLICATIONS

Song et al., Precursor of Cathode Active Material for a Lithium Secondary Battery, Method for Manufacturing the Precursor, Cathode Active Material, and Lithium Secondary Battery Including the Cathode Active Material, Apr. 2013, See the Abstract. (Year: 2013).*

Written Opinion and International Search Report dated Dec. 27, 2019 issued in International Patent Application No. PCT/KR2019/011929 (partial English translation).

Extended European Search Report dated Mar. 10, 2022 issued in European Patent Application No. 19859256.0.

Third Party of Observation issued Jul. 11, 2023 for corresponding European Patent Application No. 19859256.0.

Noh, et al., "Cathode Material with Nanorod Structure—An Application for Advanced High-Energy and Safe Lithium Batteries", 2013, Chemistry of Materials, 8 pages total.

Japanese Office Action dated Mar. 1, 2022 issued in Japanese Patent Application No. 2021-514124.

Chinese Office Action dated Dec. 12, 2023 issued in Chinese Patent Application No. 201980074470.3.

* cited by examiner

CATHODE ACTIVE MATERIAL, METHOD FOR PREPARING SAME, AND LITHIUM SECONDARY BATTERY COMPRISING SAME

CROSS-REFERENCE OF RELATED APPLICATIONS

This application is the U.S. National Phase under 35 U.S.C. § 371 of International Patent Application No. PCT/KR2019/011929, filed on Sep. 16, 2019, which in turn claims the benefit of Korean Application No. 10-2018-0108883, filed on Sep. 12, 2018, the entire disclosures of which applications are incorporated by reference herein.

TECHNICAL FIELD

The present disclosure relates to a positive active material, a manufacturing method thereof, and a lithium secondary battery including the same.

BACKGROUND ART

Recently, demands on IT mobile devices and small power driven devices (e.g., e-bikes or small EVs) are explosively increasing and demands on electric vehicles with mileages of greater than 400 km are also increasing, and according to the above-mentioned demands, secondary batteries with high capacity and high energy density for driving them are in the global development progress.

To manufacture the high-capacity batteries, high-capacity positive active materials must be used.

The material with the greatest capacity from among the currently available layered positive active materials is $LiNiO_2$ (275 mAh/g), but its structure is easily destroyed in the case of charging and discharging, and thermal stability caused by an oxidization number problem is low, so it is difficult to commercialize the material.

To solve the above-noted issue, an unstable Ni site is to be substituted with a stable transition metal (e.g., Co, Mn, etc.), and to achieve this, a ternary NCM group with substituted Co and Mn is developed.

However, thermal safety of the ternary NCM is reduced as a content of Ni increases.

DISCLOSURE

The present inventors propose a method for suppressing a decomposition of an electrolyte solution on a positive electrode surface by controlling a structure of first particles on layered second particle surfaces. By this, thermal safety of the positive active material may be improved.

An embodiment of the present invention provides a positive active material including lithium metal oxide particles in a secondary particle form including primary particles, wherein the secondary particle surface includes planar primary particles with a narrow angle of 60 to 90° from among angles between a c axis of the primary particles and a straight line connecting a virtual point of a center of the primary particle and a center point of the secondary particle.

The surface of the secondary particles signifies a portion configured by outermost primary particles of the secondary particles.

FIG. 1 shows a schematic diagram of secondary particles according to the present invention.

As shown in FIG. 1, regarding definition of a direction of arrangement of the first particles, planar primary particles with a narrow angle of 60 to 90° from among angles between a c axis of the primary particles and a straight line connecting a virtual point of a center of the primary particle and a center point of the secondary particle are defined to be planar. In detail, it may be 70 to 90°.

Further, the primary particles with the angle of equal to or greater than 0° and less than 60° are defined to be acicular. In detail, it may be equal to or greater than 0° and equal to or less than 20°.

Because of the planar particles on the secondary particle surface, the side reaction with the electrolyte solution may be suppressed and thermal stability of the positive active material may be improved.

In detail, the area occupied by the planar primary particles may be equal to or greater than 20 area % for the area of 100 area % configured by the circle of the 50% reference of the radius of the secondary particles at the center point of the secondary particle. In detail, it may be equal to or greater than 30 area %.

In detail, FIG. 2 shows a SEM photograph of secondary particles according to an embodiment of the present invention.

As shown in FIG. 2, when a circle is set with respect to the center of the secondary particle, an area of the planar primary particles inside the circle may be calculated.

In this instance, as shown in FIG. 2, an area occupied by the planar primary particles may be equal to or greater than 20 area %. In this case, as described above, a side reaction to the electrolyte solution is efficiently controlled. Further preferably, it may be equal to or greater than 50 area %, and further preferably, it may be equal to or greater than 70 area %. At a maximum, the entire area of 100 area % may be planar particles, but in reality, there may exist some acicular particles and there may exist the planar particles of equal to or less than 95 area %.

An average length of the planar primary particles existing in the area may be 750 nm to 1.25 μm for the area of 100 area % configured by the circle of the 50% reference of the radius of the secondary particles at the center point of the secondary particle.

The length of the planar primary particles signifies the length of the particles in a lengthwise direction. When the average length of the primary particles satisfies the range, a desired battery characteristic may be obtained.

Further, an inside of the secondary particle includes acicular primary particles with a narrow angle of equal to or greater than 0° and less than 60° from among angles between the c axis of the primary particles and the straight line connecting a virtual point of a center of the primary particle and a center point of the secondary particle. In detail, they may be acicular primary particles with the angle of 0 to 20°.

In detail, the inside of the secondary particle may have a radial structure in which the acicular particles are arranged toward the center of the secondary particles.

When a concentration of nickel in the secondary particles has a concentration gradient that reduces toward the surface direction from the inside, the inter direction-type structure may be developed.

In this case, a core of the innermost part of the inside of the secondary particles may include a center portion with a constant concentration of nickel. This may be appropriately controlled by a method for mixing raw materials in a stage for manufacturing a precursor to be described.

In detail, a content of nickel from among the metals in the secondary particles may be equal to or greater than 80 mol %. The concentration of nickel may be increased for a high power characteristic that is not achievable from the conventional positive active material with nickel of equal to or less than 50 mol %.

Another embodiment of the present invention provides a method for manufacturing a positive active material including: obtaining a metal precursor by inputting a metallic salt aqueous solution into a co-precipitation reactor; and obtaining a positive active material by mixing the metal precursor and a raw lithium material and baking the same, wherein, in the obtaining of a metal precursor by inputting a metallic salt aqueous solution into a co-precipitation reactor, a pH condition is changed within a range of a reaction end time of 1 to 30 time % with respect to an entire reaction time of 100 time %.

In detail, the obtaining of a precursor with a co-precipitation reaction may provide a method for changing the pH at the reaction end time. In this instance, the reaction end time may signify 1 to 30 time % from the last end time from among the entire reaction time of 100 time %.

In detail, the reaction end time may be 1 to 10 time % or 1 to 5 time % from the last end time from among the entire reaction time of 100 time %. This may influence formation of the planar primary particles on the surface of the positive active material that is a realized example of the described present invention, and may be appropriately controlled to satisfy the targeted specification.

In detail, a difference between a reaction start pH and a reaction end PH in the obtaining of a metal precursor by inputting a metallic salt aqueous solution into a co-precipitation reactor may be 0.1 to 0.8.

In further detail, the pH condition may rise by 0.1 to 0.8 within a range of the reaction end time of 1 to 30 time % for the entire reaction time of 100 time %. When the range is satisfied, the planar particles existing on the secondary particle surface may be formed to be uniform.

In detail, the rising speed of the pH condition may be 0.0016 to 0.0133 pH/min. In further detail, it may be 0.0066 to 0.0133 pH/min.

The process condition will be described in detail in an embodiment to be described.

Another realized embodiment of the present invention provides a lithium secondary battery including: a positive electrode including a positive active material according to a realized embodiment of the present invention; a negative electrode including a negative active material; and an electrolyte positioned between the positive electrode and the negative electrode.

The description on the positive active material corresponds to the above-described realized embodiment of the present invention, so it will be omitted.

The positive active material layer may include a binder and a conductive material.

The binder well attaches the positive active material particles, and well attaches the positive active material to a current collector.

The conductive material is used to provide conductivity to the electrode, and any materials are usable when they generate no chemical changes and they are electron conductive materials, regarding the configured batteries.

The negative electrode includes a current collector and a negative active material layer formed on the current collector, and the negative active material layer includes a negative active material.

The negative active material includes a material for reversibly intercalating/de-intercalating lithium ions, a lithium metal, an alloy of the lithium metal, a material for doping and dedoping lithium, or a transition metal oxide.

The material for reversibly intercalating/de-intercalating lithium ions is a carbon material, any carbon-based negative active materials generally used for the lithium ion secondary battery are usable, and for typical examples, crystalline carbon, amorphous carbon, or both of them are usable.

An alloy of the metal selected from among lithium, Na, K, Rb, Cs, Fr, Be, Mg, Ca, Sr, Si, Sb, Pb, In, Zn, Ba, Ra, Ge, Al, and Sn may be used as the alloy of the lithium metal.

The material for doping and dedoping lithium may include Si, $SiO_x$ (0<x<2), an alloy of Si—Y (the Y is selected from among an alkali metal, an alkaline earth metal, a 13-group element, a 14-group element, a transition metal, a rare earth element, and a combination thereof, and Si is not one of them), Sn, $SnO_2$, and Sn—Y (the Y is selected from among an alkali metal, an alkaline earth metal, a 13-group element, a 14-group element, a transition metal, a rare earth element, and a combination thereof, and Sn is not one of them).

The transition metal oxide may include a vanadium oxide and a lithium vanadium oxide. The negative active material layer includes a binder, and may selectively further include a conductive material.

The binder well attaches the negative active material particles, and well attaches the negative active material to the current collector.

The conductive material is used to provide conductivity to the electrode, and any materials are usable when they generate no chemical changes and they are electron conductive materials, regarding the configured batteries.

The current collector may be selected from among a copper foil, a nickel foil, a stainless steel foil, a titanium foil, nickel foams, copper foams, a polymer substrate on which a conductive metal is coated, and a combination thereof.

The negative electrode and the positive electrode are manufactured by mixing an active material, a conductive material, and a binding agent in a solvent to manufacture an active material composition, and applying the composition to the current collector. The above-noted electrode manufacturing method is known to a skilled person in the art, so no detailed description thereof will be provided in the present specification. N-methylpyrrolidone may be used as the solvent but is not limited thereto.

The electrolyte includes a non-aqueous organic solvent and a lithium salt.

The non-aqueous organic solvent functions as a medium by which ions relating to an electrochemical reaction of the battery move.

The lithium salt is dissolved in the organic solvent, it functions as a source for supplying lithium ions in the battery to enable a basic operation of the lithium secondary battery, and it promotes movement of lithium ions between the positive electrode and the negative electrode.

There may be a separator between the positive electrode and the negative electrode depending on types of the lithium secondary battery. As the separator, a polyethylene, a polypropylene, a polyvinylidene fluoride, or a multilayer thereof with at least two layers may be used, and a mixed multilayer including a two-layer separator such as polyethylene/polypropylene, a three-layer separator such as polyethylene/polypropylene/polyethylene, and a three-layer separator such as polypropylene/polyethylene/polypropylene.

The lithium secondary battery may be classified into a lithium ion battery, a lithium ion polymer battery, and a lithium polymer battery according to the types of the used separators and electrolytes, it may be divided into cylindrical, square, coin-type, and pouch-type according to shapes, and bulk-type and thin-film-type according to sizes. The structure of the battery and the manufacturing method are known to a person skilled in the art, and a detailed description thereof will be omitted.

Regarding the positive active material according to an embodiment of the present invention, the plate side with low reactivity contacts the electrolyte solution, and hence, decomposition of the electrolyte solution on the positive electrode surface may be suppressed.

The thermal safety of the positive active material is improved by the reduction of the side reaction of the electrolyte solution.

In detail, in the analysis of the DSC, the peak temperature rises and the total heating value reduces, thereby providing the positive active material with improved thermal safety.

MODE FOR INVENTION

Figure 1:
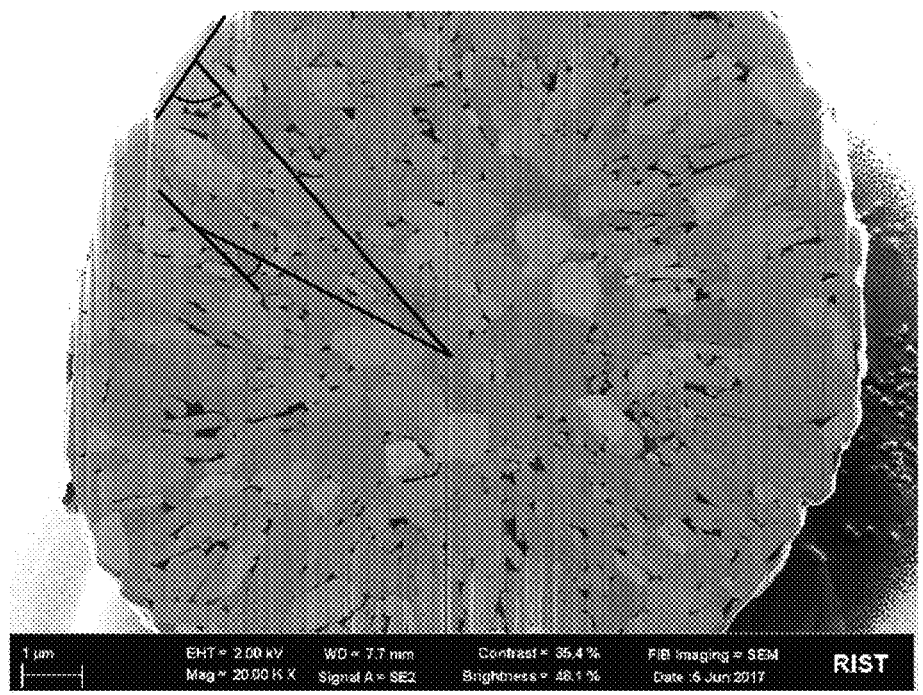
FIG. 1 shows a schematic diagram of secondary particles according to the present invention.

Exemplary embodiments of the present invention will now be described in detail. However, these are presented as examples, and the present invention is not limited thereto and is only defined by the scope of the claims to be described later.

(Embodiment 1) Manufacturing Ni 88 Mol % of Positive Active Material

1) Manufacturing Metallic Salt Solution

First of all, two metallic salt aqueous solutions with different concentrations of Ni, Co, and Mn are manufactured by using $NiSO_4 \cdot 6H_2O$ as a raw material of nickel, $CoSO_4 \cdot 7H_2O$ as a raw material of cobalt, and $MnSO_4 \cdot H_2O$ as a raw material of manganese.

Regarding the first metallic salt aqueous solution for forming a core, the above-noted respective raw materials are mixed so as to satisfy a stoichiometric molar ratio of $(Ni_{0.98}Co_{0.01}Mn_{0.01}, OH)_2$ in the distilled water.

Independently, regarding the second metallic salt aqueous solution for forming a shell, the above-noted respective raw materials are mixed so as to satisfy a stoichiometric molar ratio of $(Ni_{0.64}Co_{0.23}Mn_{0.13}, OH)_2$ in the distilled water.

2) Co-Precipitation Process

A co-precipitation reactor with two metallic salt aqueous solution supply tanks coupled in series is prepared, and the first metallic salt aqueous solution and the second metallic salt aqueous solution are charged into the respective metallic salt aqueous solution supplying tanks.

The distilled water is put into the co-precipitation reactor, and is stirred, while maintaining a temperature of the reactor.

Further, $NH_4(OH)$ is used as a chelating agent, and a solution of NaOH is used as a pH control agent.

In this instance, the initial pH in the reactor for a reaction progress is set to be 11.2.

As described, the pH is maintained to be constant, and an input time and an input amount of the respective metallic salt solutions to the reactor to which the chelating agent is supplied from the two metallic salt aqueous solution supply tanks connected in series.

In detail, the first metallic salt aqueous solution is input per 0.4 liter/hour, and the co-precipitation reaction is performed until a diameter of precipitates may become about 11.1 μm. In this instance, an average stay time in the reactor of the solution is set to be about ten hours by controlling a flux, and a normal state maintaining time is given to the reaction material after the reaction has reached a normal state so as to obtain the co-precipitation compound with a greater density.

The entire supply solution is input 0.4 liter/hour while changing the mixing ratio of the first metallic salt aqueous solution and the second metallic salt aqueous solution, a supply speed of the first metallic salt aqueous solution is gradually reduced by 0.05 liter/hour, and the supply speed of the second metallic salt aqueous solution is gradually increased by 0.35 liter/hour. In this instance, an average stay time in the reactor of the solution is set to be within about twenty hours by controlling the flux, and finally the co-precipitation reaction is performed until the diameter of the precipitate becomes 16.0 μm.

In this instance, the pH, one hour before the reaction end time, is increased to the range of 12.0

A pH adjust speed is 0.0133 pH/min.

3) Post-Processing Process

The precipitate obtained according to the co-precipitation process is filtered, it is rinsed with water, and it is dried for 24 hours in an oven at 100° C., to thus manufacture an active material precursor with particles with a large diameter of which a composition of the entire particles is $(Ni_{0.88}Co_{0.095}Mn_{0.025}, OH)_2$, and an average diameter is 16.0 μm.

4) Baking Process

There is a core-shell concentration gradient, a precursor with the composition of $Ni_{0.88}Co_{0.095}Mn_{0.025}(OH)_2$, $ZrO_2$ (Aldrich, 4N, with reference to the Zr concentration of 3400 ppm), and $Al(OH)_3$ (Aldrich, 4N, with reference to the Al concentration of 140 ppm) are uniformly mixed, $LiOH \cdot H_2O$ (Samchun Chemicals, a battery grade) is mixed therewith with the molar ratio of 1:1.05, they are charged into a furnace, oxygen is input, and they are baked.

Natural cooling is performed, and the positive active material is manufactured through grinding and classification.

(Embodiment 2) Manufacturing Ni 88 Mol % of Positive Active Material

The positive active material is manufactured in a like manner of Embodiment 1, excluding the point that the molar ratio of $(Ni_{0.88}Co_{0.095}Mn_{0.025}, OH)_2$ is satisfied when the raw material is prepared, the point that the reaction start pH during a reaction progress is adjusted to 11.2 in the co-precipitation process, the pH, an hour before the reaction end time, is adjusted to increase to the range of 11.8, and the point that the pH adjust speed is adjusted to 0.01 pH/min.

(Embodiment 3) Manufacturing Ni 88 Mol % of Positive Active Material

The positive active material is manufactured in a like manner of Embodiment 2, excluding the point that the reaction start pH during a reaction progress is adjusted to 11.2 in the co-precipitation process, the pH, an hour before the reaction end time, is adjusted to increase to the range of 11.6, and the point that the pH adjust speed is adjusted to 0.0066 pH/min.

(Embodiment 4) Manufacturing Ni 88 Mol % of Positive Active Material

The positive active material is manufactured in a like manner of Embodiment 2, excluding the point that the reaction start pH during a reaction progress is adjusted to 11.2 in the co-precipitation process, the pH, an hour before the reaction end time, is adjusted to increase to the range of 11.4, and the point that the pH adjust speed is adjusted to 0.0033 pH/min.

(Comparative Example 1) Manufacturing Ni 88 Mol % of Positive Active Material

The positive active material is manufactured in a like manner of Embodiment 2, excluding the point that the pH is maintained at 11.0 during the reaction progress in the co-precipitation process.

(Experimental Example 2) Analysis (TEM) of Shape of Positive Active Material Cross-Sectional Portion Regarding the positive active material according to Embodiment 1, Embodiment 3, and Comparative Example 1, a cross-section of the positive electrode material is incised with an FIB, and a shape distribution of primary particles of the cross-section of the positive electrode material is observed with a TEM analysis tool.

Figure 5:
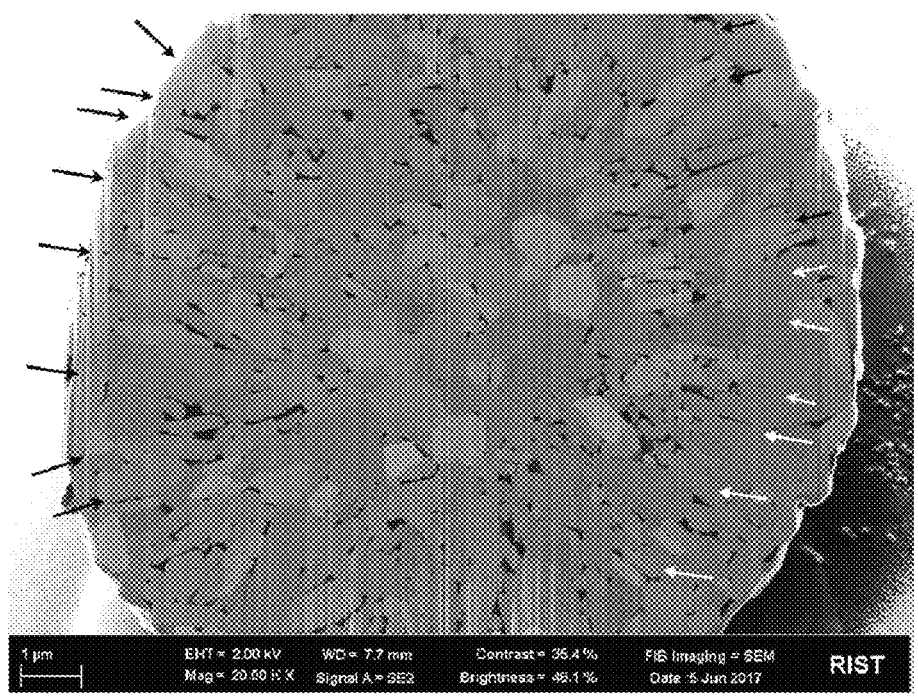
FIG. 5 shows a cross-section shape of a positive active material according to a first embodiment.
Figure 6:
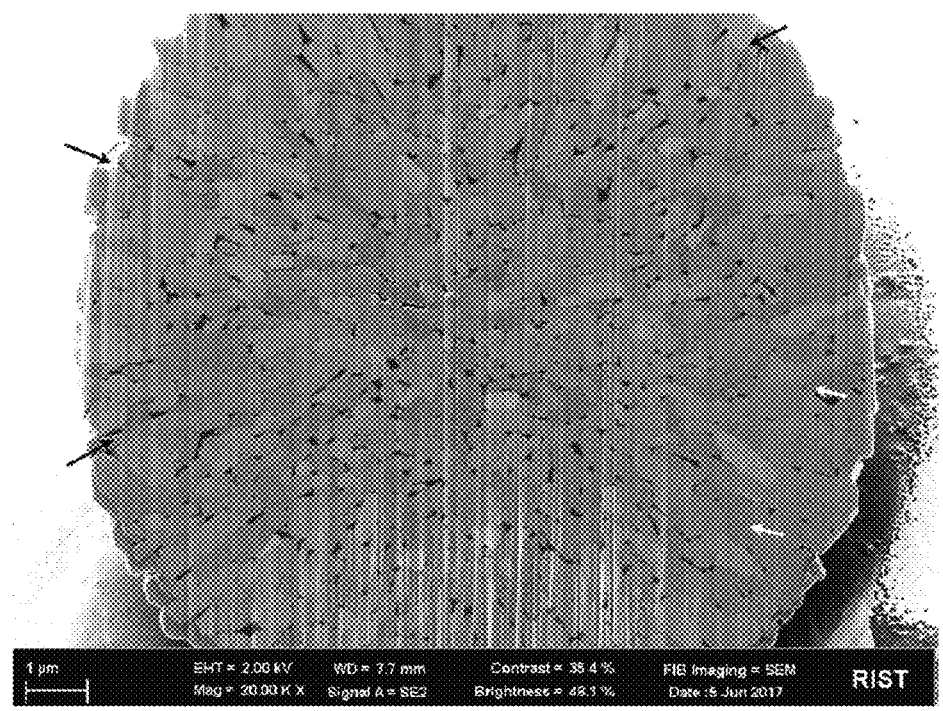
FIG. 6 shows a cross-section shape of a positive active material according to a third embodiment.
Figure 7:
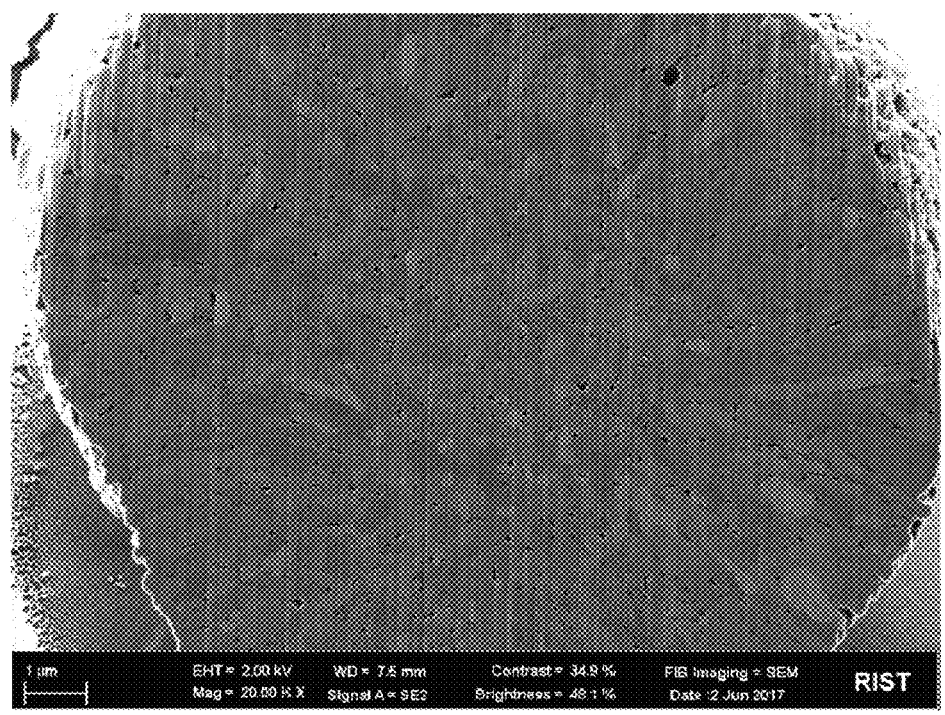
FIG. 7 shows a cross-section shape of a positive active material according to a first comparative example.

FIG. 5 shows a cross-section shape of a positive active material according to a first embodiment, FIG. 6 shows a cross-section shape of a positive active material according to a third embodiment, and FIG. 7 shows a cross-section shape of a positive active material according to a first comparative example.

An arrangement of the primary particles in the positive active material shows a plurality of acicular particles in Embodiment 1, Embodiment 3, and Comparative Example 1, and the acicular particles show a radial form in which they are arranged toward the center of the secondary particle.

However, in the case of the arrangement of the primary particles on the positive active material surface, Compara-

TABLE 1

|  | Co-precipitation reaction start pH | Co-precipitation reaction end pH | pH change rates | Co-precipitation reaction hour (h) | Co-precipitation reaction pH change time (h) | pH change speed |
|---|---|---|---|---|---|---|
| Embodiment 1 | 11.2 | 12.0 | 0.8 | 21 | 20 | 0.0133 |
| Embodiment 2 | 11.2 | 11.8 | 0.6 | 21 | 20 | 0.01 |
| Embodiment 3 | 11.2 | 11.6 | 0.4 | 21 | 20 | 0.0066 |
| Embodiment 4 | 11.2 | 11.4 | 0.2 | 21 | 20 | 0.0033 |
| Comparative Example 1 | 11.0 | 11.0 | — | 21 | — | — |

(Experimental Example 1) Analysis (SEM) of Shape of Positive Active Material Surface The shape of the primary particles on the positive active material surface is observed through SEM analysis on the positive active material according to Embodiment 1, Embodiment 3, and Comparative Example 1.

Figure 2:
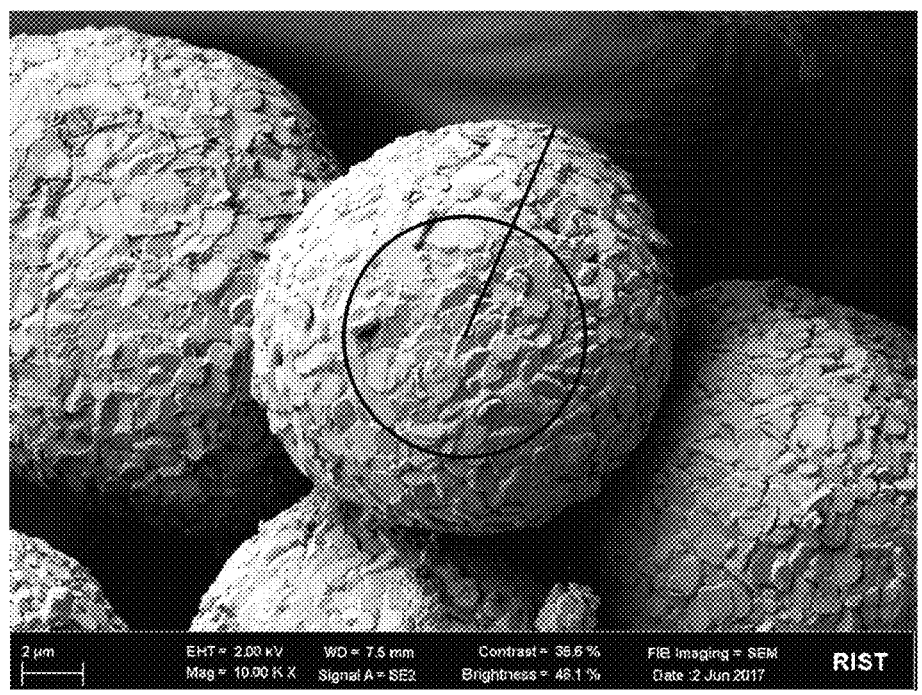
FIG. 2 shows a shape of primary particles on a surface unit of a positive active material according to a first embodiment.

FIG. 2 shows a shape of primary particles on a surface unit of a positive active material according to a first embodiment, finding that planar primary particles uniformly surround the positive active material surface. No insertion/separation reaction of Li is generated on a plate side (c-axis side) of the primary particles, so it is expected that decomposition of the electrolyte solution is suppressed on the positive electrode surface.

Figure 3:
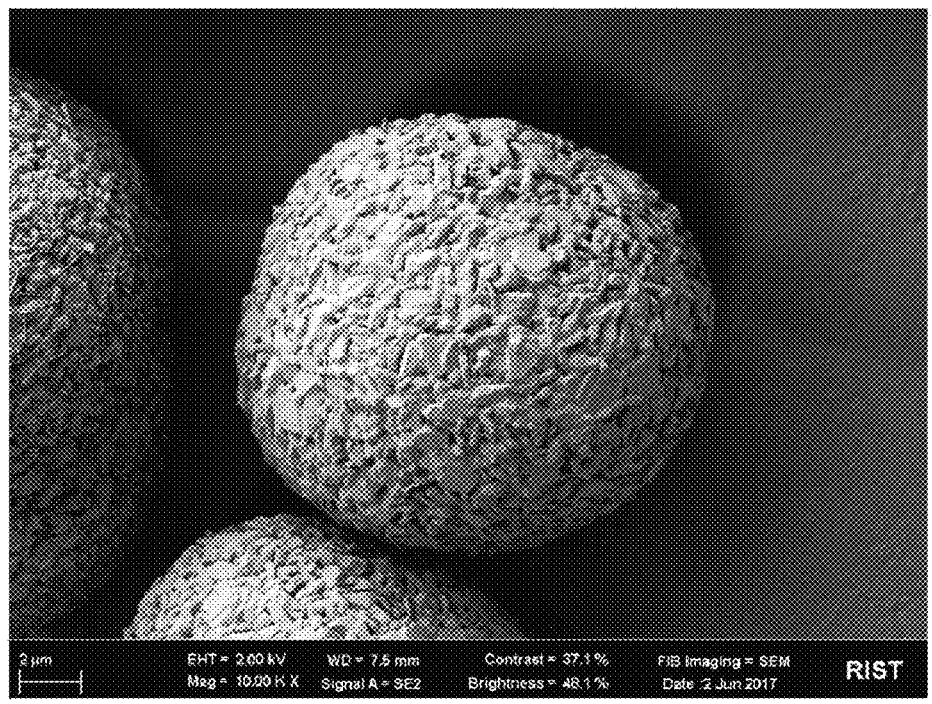
FIG. 3 shows a shape of primary particles on a surface unit of a positive active material according to a third embodiment.

FIG. 3 shows a shape of primary particles on a surface unit of a positive active material according to a third embodiment, and planar primary particles and acicular particles are mixed on the positive active material surface.

Figure 4:
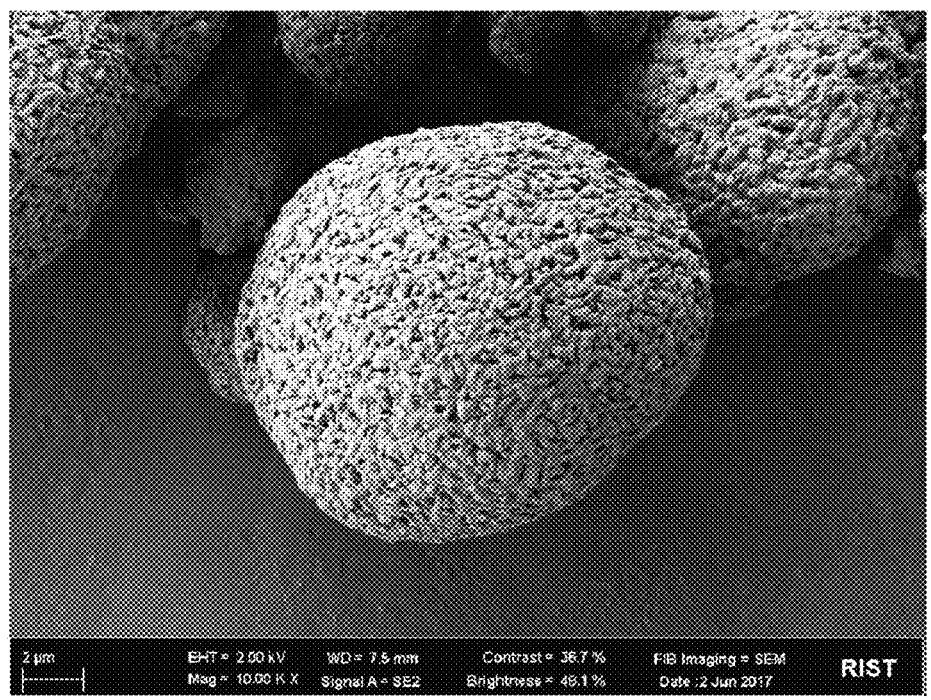
FIG. 4 shows a shape of primary particles on a surface unit of a positive active material according to a first comparative example.

FIG. 4 shows a shape of primary particles on a surface unit of a positive active material according to a first comparative example, wherein acicular primary particles are uniformly distributed. This is conventionally similar to the shape observed when the positive active material is manufactured.

tive Example 1 shows an acicular form in a like manner of the inside, and in the case of Embodiment 3, it is found that the planar primary particles and the acicular primary particles are mixed.

It is found that the positive active material according to Embodiment 1 has more planar particles.

It is examined how large the area of the planar primary particles occupy on the positive active material surface according to Embodiments 1 to 4 and Comparative Example 1.

This is found according to a following method.

With reference to the SEM photograph of the secondary particles as shown in FIG. 2, for the area of 100 area % configured by the circle of the 50% reference of the radius of the secondary particles at the center point of the secondary particle, the area occupied by planar particles is calculated.

TABLE 2

| Classification | Area [%] occupied by planar particles | Average length [μm] of planar particles |
|---|---|---|
| Embodiment 1 | 95 | 1.21 |
| Embodiment 2 | 50 | 1.05 |
| Embodiment 3 | 30 | 1.01 |
| Embodiment 4 | 20 | 0.90 |

TABLE 2-continued

| Classification | Area [%] occupied by planar particles | Average length [μm] of planar particles |
|---|---|---|
| Comparative Example 1 | 2 | 0.60 |

(Experimental Example 3) Measuring Differential Scanning Calorimetry (DSC) in Charged State A coin cell is manufactured with the positive active material according to Embodiments 1 to 4 and Comparative Example 1, it is charged, and a thermal safety analysis is performed on the positive active material through a DSC by disassembling the coin cell.

Regarding an electrode plate slurry, it is given that positive electrode:conductive material (denka black):binder (PVDF, KF1100)=92.5:3.5:4 wt %, and viscosity of the slurry is adjusted by adding NMP (N-methyl-2-pyrrolidone) so that a solid content may be about 30%.

The manufactured slurry is coated on an Al foil that is 15 μm thick by a doctor blade method, and it is dried and is then rolled.

An electrode loaded amount is 14.6 mg/cm$^2$, and rolling density is 3.1 g/cm$^3$. The electrolyte solution uses 1M LiPF$_6$ in ethylene carbonate:di-methyl carbonate:ethyl methyl carbonate=3:4:3 (vol %), and the coin cell is manufactured by using a polypropylene separating film and a lithium negative electrode (200 um, Honzo metal). A charging condition is given as a CC/CV 2.5-4.25 V and 1/20 C cut-off charging condition.

The coin cell is disassembled from a dry product to gather 10 mg of the positive active material and perform a DSC analysis.

Regarding the DSC analysis, while the temperature rises from 25° C. to 400° C. at 5° C./minute, an on-set temperature at which heat generating reaction starts, a peak temperature at which a heating amount becomes Max, and a total heating amount are analyzed, and results are summarized in Table 3.

(Experimental Example 4) Electrochemical Characteristic

Regarding the positive active material according to Embodiments 1 to 4 and Comparative Example 1, a 2032 coin-type half battery is manufactured according to the same method as in Experimental Example 3, it is aged for ten hours at room temperature of 25° C., and a charging and discharging test is performed.

Capacity is estimated with 215 mAh/g as reference capacity, and a condition of CC/CV 2.5-4.25 V, 1/20 C cut-off is applied as a charging and discharging condition. Initial capacity is performed in the condition of 0.2 C charging/0.2 C discharging.

TABLE 3

| | On-set temperature [° C.] | Peak temperature [° C.] | Total heating amount [J/g] |
|---|---|---|---|
| Embodiment 1 | 218.0 | 232.0 | 1198 |
| Embodiment 2 | 216.5 | 228.1 | 1258 |
| Embodiment 3 | 216.0 | 225.9 | 1304 |
| Embodiment 4 | 216.1 | 223.7 | 1389 |
| Comparative Example 1 | 215.7 | 221.8 | 1419 |

It is found from Table 3 that thermal safety of the active material according to an embodiment is improved as the peak temperature rises and the total heating amount is reduced.

TABLE 4

| | Charging capacity [mAh/g] | Discharging capacity [mAh/g] | Coulomb efficiency [%] |
|---|---|---|---|
| Embodiment 1 | 233.54 | 210.1 | 90.0 |
| Embodiment 2 | 233.56 | 210.6 | 90.2 |
| Embodiment 3 | 233.54 | 211.3 | 90.5 |
| Embodiment 4 | 233.55 | 211.6 | 90.6 |
| Comparative Example 1 | 233.58 | 211.8 | 90.7 |

As can be known from Table 4, the positive active material according to an embodiment shows the equivalent level of charging and discharging capacity and efficiency as in Comparative Example 1, although the thermal stability is substantially improved as expressed in Table 3.

The present invention is not limited to the exemplary embodiments and may be produced in various forms, and it will be understood by those skilled in the art to which the present invention pertains that exemplary embodiments of the present invention may be implemented in other specific forms without modifying the technical spirit or essential features of the present invention. Therefore, it should be understood that the aforementioned exemplary embodiments are illustrative in terms of all aspects and are not limited.

The invention claimed is:

1. A positive active material including lithium metal oxide particles in a secondary particle form including primary particles,
    wherein the secondary particle surface includes planar primary particles with a narrow angle of 60 to 90° from among angles between a c axis of the primary particles and a straight line connecting a virtual point of a center of the primary particle and a center point of the secondary particle, and
    with respect to the area of 100 area % formed by a circle of 50% reference of a radius of the secondary particles at the center point of the secondary particle, an area occupied by the planar primary particles is equal to or greater than 20 area %.

2. The positive active material of claim 1, wherein
    with respect to the area 100 area % formed by the circle of 50% reference of the radius of the secondary particles at the center point of the secondary particle, and
    an average length of the planar primary particles existing in the area is 750 nm to 1.25 μm.

3. The positive active material of claim 1, wherein
    an inside of the secondary particle includes acicular primary particles with a narrow angle of equal to or greater than 0° and less than 70° from among angles between a c axis of the primary particles and a straight line connecting a virtual point of a center of the primary particle and a center point of the secondary particle.

4. The positive active material of claim 1, wherein a content of nickel from among metals in the secondary particle is equal to or greater than 80 mol %.

5. A method for manufacturing the positive active material of claim 1, comprising:
obtaining a metal precursor by inputting a metallic salt aqueous solution into a co-precipitation reactor; and
obtaining a positive active material by mixing the metal precursor and a raw lithium material and baking the same,
wherein, in the obtaining of a metal precursor by inputting the metallic salt aqueous solution into the co-precipitation reactor, a pH condition is changes within a range of a reaction end time of 1 to 30 time % with respect to an entire reaction time of 100 time %, and the pH condition rises by 0.1 to 0.8 within a range of the reaction end time of 1 to 30 time % for the entire reaction time of 100 time %.

6. The method of claim 5, wherein a difference between a reaction start pH and a reaction end pH in the obtaining of a metal precursor by inputting the metallic salt aqueous solution into the co-precipitation reactor is 0.1 to 0.8.

7. The method of claim 5, wherein the rising speed of the pH condition is 0.0016 to 0.0133 pH/min.

8. A lithium secondary battery comprising:
a positive electrode including the positive active material according to claim 1;
a negative electrode including a negative active material; and
an electrolyte positioned between the positive electrode and the negative electrode.

* * * * *